Patented Oct. 22, 1929

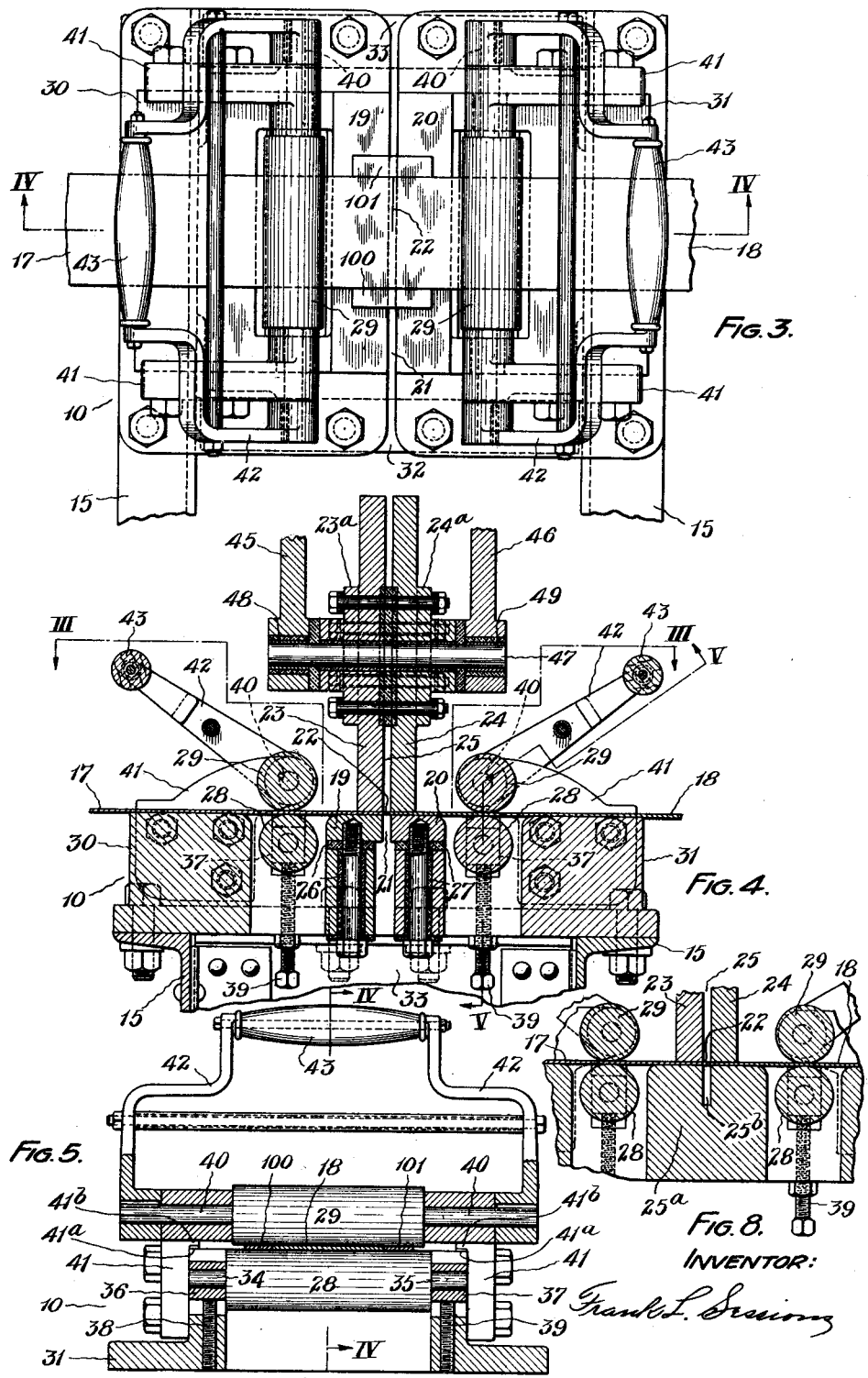

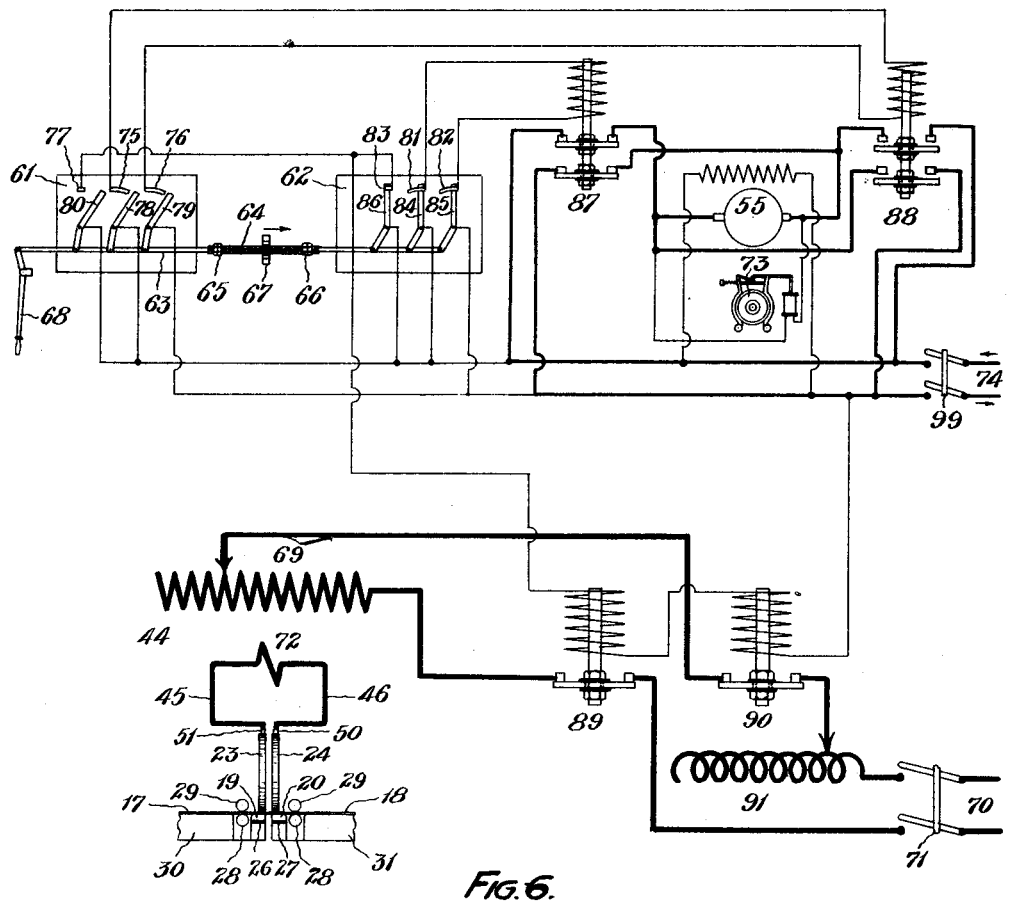
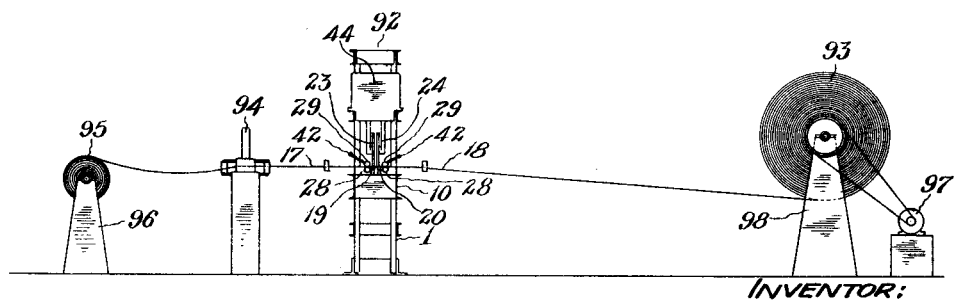

1,732,383

UNITED STATES PATENT OFFICE

FRANK L. SESSIONS, OF LAKEWOOD, OHIO

METHOD OF AND APPARATUS FOR ELECTRIC WELDING

Application filed October 15, 1925, Serial No. 62,543. Renewed March 5, 1929.

My invention relates particularly to progressive butt seam welding by the electrical resistance method.

Among the objects of my invention are:— the provision of new and useful apparatus for progressively electrically welding a butted seam in metal; the provision of a new and useful method of progressively electrically welding a butted seam in metal; the provision of means for pressing together the contacting surfaces of the seam-cleft simultaneously throughout the length to be welded; the provision of means for supporting the parts to be welded closely adjacent to the seam-cleft; the provision of means for causing electric welding current to flow across the seam-cleft in a narrow path or heat zone; and the provision of means for causing the current path or heat zone to move longitudinally along the seam-cleft to progressively heat its edges.

The foregoing and other objects are accomplished by the use of my invention described in this specification and shown in the accompanying drawings, in which Fig. 1 is an end elevation of a welding machine built in accordance with my invention;

Fig. 3 is a detached plan view of the work supporting and clamping means taken on line III—III of Fig. 2, but drawn to a larger scale;

Fig. 4 is an enlarged view of a portion of Fig. 2, the lower part of Fig. 4 being also a section on line IV—IV of Fig. 3;

Fig. 5 is a vertical section on line V—V of Fig. 4;

Fig. 6 is a diagram of connections of the electrical circuits of my invention;

Fig. 7 is an assembly drawing showing my invention and co-operating apparatus electrically welding together the ends of coils of metal strips; and Fig. 8 is a vertical transverse section of a modified form of work support.

Figure 1:
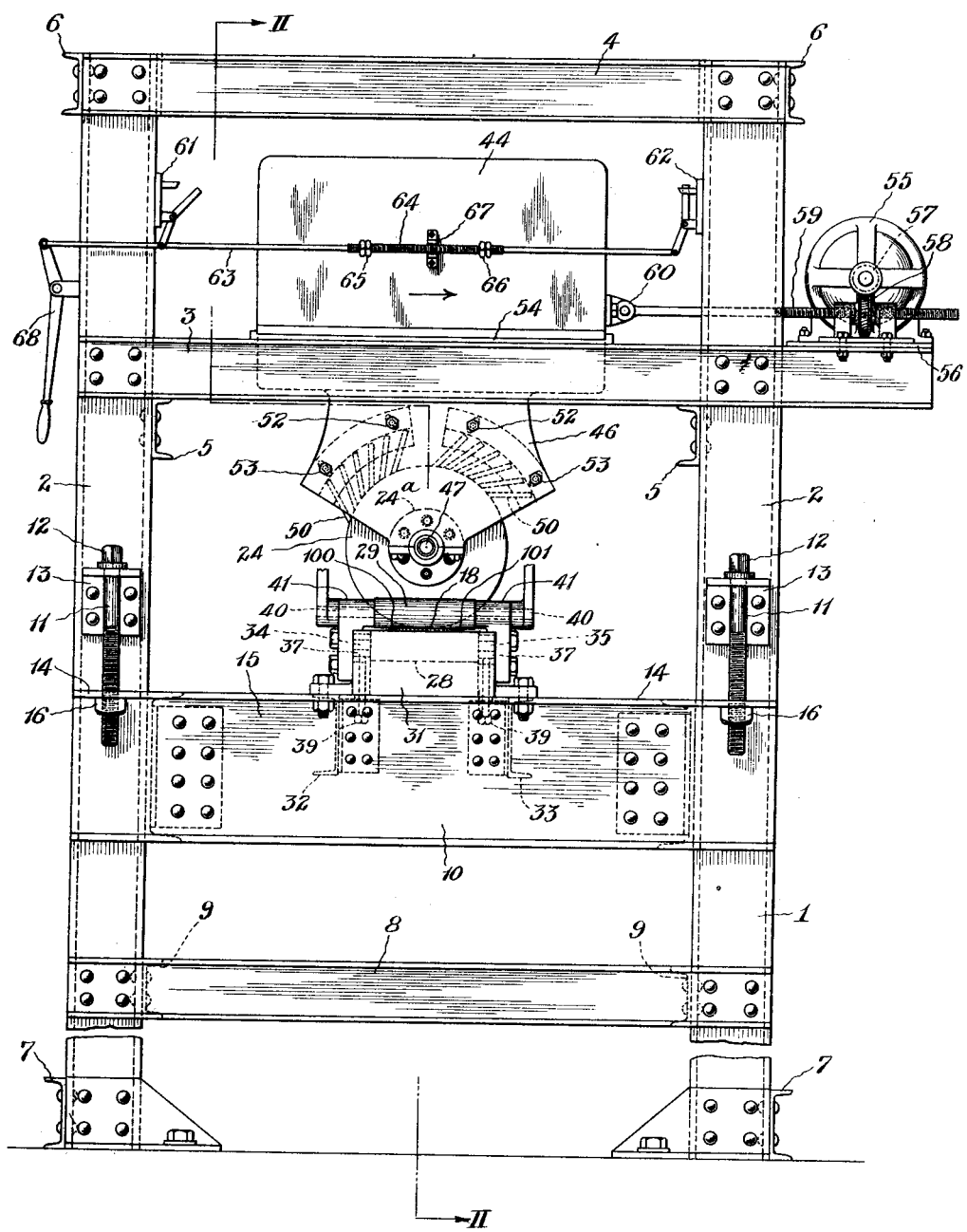
Figure 2:
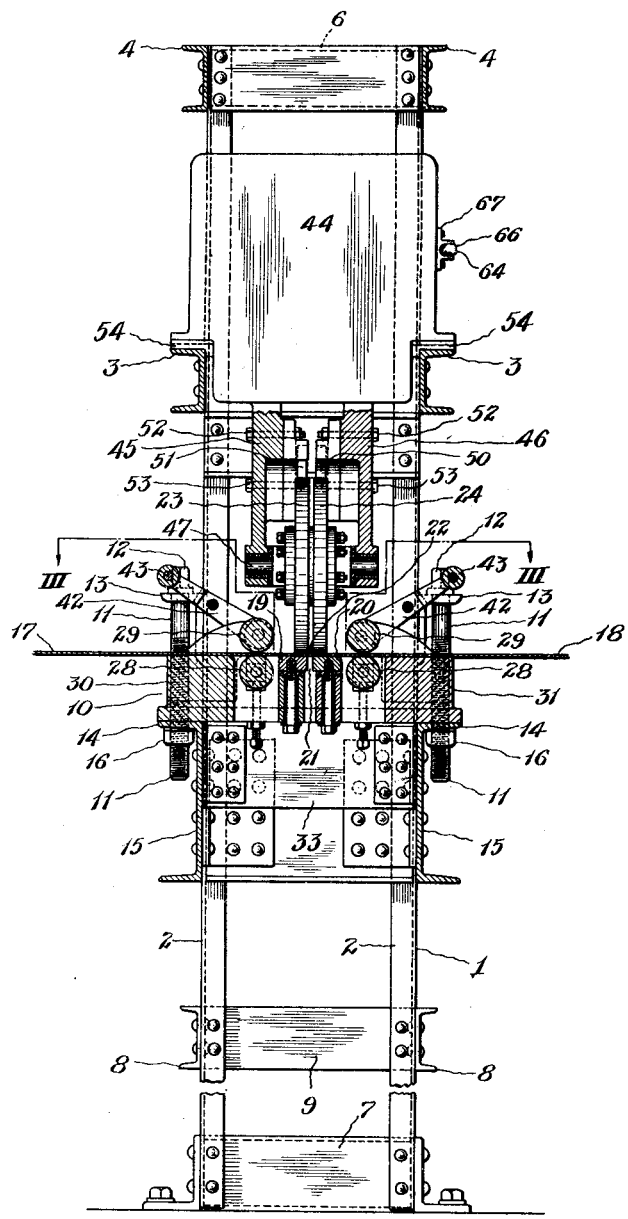
Fig. 2 is a vertical section through the machine on line II—II of Fig. 1.

I am aware that heretofore it has been proposed to electrically butt weld the edges of a longitudinal seam-cleft in metal. There are two well known methods and types of apparatus for doing this work.

One of the well known methods referred to is that in which the surfaces which are to be welded together are pressed into contact throughout the entire length of the seam to be welded and electric current in large volume is caused to flow across the seam-cleft and simultaneously heat its entire length. When the metal has been heated to a welding temperature throughout the entire length of the seam-cleft, strong pressure is applied to force the parts to be welded together simultaneously throughout the entire length of the seam-cleft.

The other well known method above mentioned is that in which the edges of the seam-cleft are pressed into firm contact at one point only in its length and are not pressed together at other points while electric current is caused to flow across the seam-cleft in a narrow path at the point where the pressure is applied. Simultaneously, the path of the current (heat zone) across the seam-cleft is made to move progressively along the seam. The application of pressure to the seam-cleft is also traversed progressively along the seam-cleft synchronously with the path of current and substantially coincident with it to the end that localized pressure to close the seam-cleft is applied at all times at approximately the point where the welding current is flowing. The seam-cleft surfaces are thus progressively heated, progressively pressed together and progressively welded. This progressive seam welding by the electric resistance method has been commercially used only to weld longitudinal seams in tubes.

I have found that if the seam-cleft be firmly pressed together throughout a length that it is desired to weld, the seam-cleft can be welded progressively without applying localized pressure to close the seam-cleft in the heat zone by causing electric welding current in large volume to flow across the seam-cleft in a narrow, localized path or heat zone and by causing that path or heat zone to progressively move along the seam-cleft, I have found also that if the terminals of a suitable electric welding circuit be made to contact with small areas upon immediately opposite sides of the seam-cleft closely adjacent thereto while the seam-cleft surfaces are thus pressed together throughout a considerable length, a large volume of current will flow through the work between the terminals. This flow of current will be concentrated largely in a narrow path across the seam-cleft and will heat the edge surfaces of the seam-cleft that are in the path of concentrated current flow to welding temperature. Current will not flow across the seam-cleft in large volume at other points.

My invention is based upon these phenomena.

In electric welding by the method and apparatus of my invention, the edges of the seam-cleft that are to be welded are pressed firmly together simultaneously throughout the length of the seam to be welded and while they are thus held together in proper register and firm electrical contact, electric welding current is caused to flow across the seam-cleft in a narrow path at one point and this current path or heat zone is traversed longitudinally along the seam whereby the seam-cleft surfaces are progressively heated and welded. It will be observed that the applied pressure is distributed throughout the length of the seam-cleft and is not confined to the heat zone as in the heretofore known method of progressive seam welding described above.

I do not make a claim to cover broadly the foregoing described method as it is broadly covered by my patent Reissue No. 16,804, original No. 1,630,866 (original application filed November 5, 1925).

The sudden (almost instantaneous) expansion of the metal that doubtless occurs in the heat zone may greatly increase the pressure of the contacting surfaces of the seam-cleft against each other at the point where and the instant when welding occurs and this pressure may cause or quicken the coalescing of the metal grains or crystals. But such resultant, localized pressure, even though it be essential to the successful operation of my invention, develops within the metal and is not externally applied as in previously known electric resistance seam welding.

It will be observed that the seam edges are pressed into firm contact and held in proper register simultaneously throughout the length to be welded and that the unwelded edges are not allowed to be out of contact or in poor contact at all other points except in the welding zone as is done in progressive butt-seam welding as heretofore practiced.

While it is possible and economical to progressively butt-weld longitudinal seams in relatively small diameter tubes by the heretofore used method in which both the pressure and the heat zones are synchronously moved progressively along the seam, it becomes increasingly difficult to follow this method as the diameter of the tube becomes large relative to the thickness of its wall due to the tendency of the seam edges to lap. It is especially difficult, and I believe it has thus far been commercially impossible, to utilize this method for welding together flat strips or sheets of thin metal. The welding of large diameter cylinders, such as barrels, range boiler and heater shells, has been accomplished by this method only with difficulty and at high cost.

By the use of my invention longitudinal seams in large cylinders of relatively thin metal or the edges of flat strips or sheets may be progressively welded together while held in accurate alignment and register. It will be observed that, as compared to the method of butt-welding in which the entire length of the seam is heated simultaneously, my method, like the known progressive seam welding method described above, requires the application of a much smaller volume of electric current as only a very short length of the seam is heated at one time.

In the operation of my invention, the best results are obtained when the current volume which heats the metal to be welded; the rate of progression of the heating zone along the seam; and the pressure exerted to force the walls of the seam-cleft together are so correlated that the heating of the metal is confined chiefly to the contacting surfaces of the seam-cleft only and welding occurs before sufficient time has elapsed for the heat to be conducted further back into the metal to soften it sufficiently to render it too weak to exert the pressure on the seam-cleft necessary to make its surfaces coalesce.

If it were possible to supply the welding circuit with continuous direct current in sufficient volume, the speed of resistance seam welding with my invention when using such current would appear to be limited only by the mechanical capacity of the apparatus used to press the walls of the seam-cleft together in accurate meeting register and to traverse the heat zone along the seam. The difficulties attending the generation and transmission of direct current of large volume and low voltage are too great, for the present at least, to permit its use in my invention.

The speed of resistance seam welding with alternating current is limited by other factors which will now be explained.

When welding at high speeds with alternating current, the heating effect of each current impulse is usually discernible in the appearance of the welded seam due to the fact that the current flow and consequently its heat effect varies from zero to a maximum and back to zero during each impulse. In carrying out my method of welding, I have observed that, as the rate of traverse of the heat zone (speed of welding) is increased, the current frequency remaining constant, there is sometimes a tendency to leave alternate welded and unwelded spots synchronizing with the points of maximum and zero values of the current impulses. If this effect is not desired it may be overcome by using current of higher frequency or by reducing the speed of welding until the effect disappears and the weld is continuous.

It is obvious that with a constant speed of welding the length of seam-cleft traversed by the heat zone during each current impulse is constant and that this length can be mathematically calculated. It is the fraction of an inch obtained by dividing the speed in feet per minute of welding by ten times the current frequency in cycles per second. For example, if the speed be 60 feet per minute and the current frequency be 60 cycles per second, then $\frac{60}{600} = \frac{1}{10}$ inch of seam-cleft traversed during each current impulse.

It will be apparent that if the current frequency be doubled, or 120 cycles per second, the length of seam-cleft traversed during each current impulse will be exactly $\frac{1}{20}$ th of an inch at the same speed of welding, 60 feet per minute. The higher the current frequency relative to the speed of traverse of seam-cleft, or the lower the speed of traverse of seam-cleft relative to the current frequency, the shorter will be the length of seam-cleft traversed during each current impulse and the tendency to leave unwelded spots between the welds will decrease proportionately because the current-impulse heat-effects will be expended upon relatively shorter lengths of the seam-cleft, the points of maximum temperature will be closer together and heat will be conducted quicker from these points to the points of minimum temperature and assure the making of a continuous weld.

It will be understood that the maximum or peak temperature developed in the metal at the seam-cleft surfaces may be within the welding temperature range below the melting point, or it may reach the melting point or even higher temperature. The fact that the alternating current impulses are separated by nodes of zero current flow makes satisfactory welding possible without burning the metal although the volume of current may vary considerably during the welding of a seam.

The speed of welding at which the desired characteristics of the weld may be obtained with a given frequency of current and thickness and character of stock can readily be determined by trial as will be understood by those skilled in the art. I have found when using 60 cycle alternating current that .050 inch thick low carbon steel stock can be welded at from 30 to 100 feet per minute with from 2½ to 2¾ volts across the electrodes and with from about 50 to 65 kilowatts supplied to the primary winding of the welding transformer. The power consumed in the weld itself cannot be readily measured or accurately estimated due to the difficulty of connecting instruments in the welding circuit and due to the short circuiting of the welding circuit through the welded seam and through parts of the machine. The total power required will vary with different apparatus and different characters of stock being welded.

An advantage of welding at high-speed is that the welding temperature is attained in the edge surfaces only of the seam-cleft and that, due to the relatively slow speed of heat-conduction in metal, there is not time for the heat to be conducted back into the metal away from the seam-cleft to soften it while the heat zone is passing. The thin film of metal that is softened by the welding heat is consequently confined by the immediately adjacent unsoftened metal and coalesces due to the pressing together of the surfaces of the seam-cleft by the unyielding, unsoftened metal back of them. Further, the thin film of metal that has been heated expands and is slightly upset along the welded seam. This softened metal immediately sets and contracts with great force to draw together the opposite sides of the unwelded seam-cleft just in front of the welding zone and thus locally augments the initially applied distributed pressure of the surfaces of the seam-cleft upon each other.

Whether or not my invention will operate at speeds less than about 30 feet per minute, I do not know. I do know, however, that as the speed is lessened the edges of the seam-cleft are softened to a greater extent and welding becomes more difficult. It appears that thick metal can be satisfactorily welded at lower speeds than thin metal, perhaps because of the greater resistance to upsetting offered by the thicker metal. In any event, the limitations of my invention can readily be determined by those skilled in the art by following the teachings of this specification when using a given machine to weld specific material.

Referring to the drawings:—A suitable supporting frame 1 is provided and may be constructed in any suitable way of any suitable material. In the drawings this frame is shown as built up of four vertical channel members 2 and suitable lateral members, such as 3, 4, 5, 6, 7, 8, 9, properly secured together to form an upright skeleton frame of strong and rigid construction.

A vertically adjustable work-frame 10 is mounted upon the stationary frame 1 and suitable means may be provided for the vertical adjustments of the work-frame. In the drawings this means comprises the screws 11 which have collared heads 12 resting upon brackets 13, which are secured to the legs 2 of the frame 1. The screws 11 pass vertically through clearance holes in the flange 14 of the channel 15 which forms part of the frame 10 and are threaded into nuts 16. Vertical adjustments of the work-frame may be effected by the manipulation of the screws 11 in an obvious manner.

The parts to be welded together, which for purposes of illustration are shown in the drawings as the ends 17, 18 of two strips of metal, are supported closely adjacent to their abutted edges by work-supporting bars 19—20 respectively. These work-supporting bars are carried by the vertically adjustable frame 10 and move up and down with its adjustments. The bars 19—20 are spaced apart as shown at 21 along the seam-cleft 22 so as not to short circuit the welding current which is conducted to the work by the electrodes 23—24. The space 25 between the electrodes may be left open as shown in the drawings or insulating material may be used to fill it in well known manner. Insulating material may also be used in the space between the bars 19—20 if desired but this is not essential. In fact, the work support may consist of a single bar having a vertical slot directly under the seam-cleft of the work as shown at 25ª in Fig. 8. In this construction the current path across the seam-cleft through the work is so short that most of the current will flow through it and a relatively small amount around the slot 25ᵇ in the bar 25ª.

The width of the space 25 may vary with the thickness of the work and is determined somewhat by the limit of accuracy with which the seam-cleft 22 can be positioned and aligned. For best results, the electrodes should contact with the work equal distances away from the seam-cleft. If the seam-cleft be accurately aligned centrally between the electrodes, the space 25 may be about one-tenth of an inch for work thickness up to about No. 18 Birmingham wire gauge, and may be made proportionately wider for thicker work. The space 21, between work-supporting bars 19—20 may be made equal to or a little greater than the space between the electrodes to properly support the work under the electrodes. The tops of the work supports 19—20 are made level with each other so that the edges of the work will properly register. If desired, the work-supporting bars 19—20 may be insulated from the work frame as shown at 26—27.

For clamping the work to the work frame and for pressing the edges of the seam-cleft together, pairs of roller clamps each comprising rolls 28—29 may be employed and these may be incorporated in the work frame platens 30—31 which are mounted upon and secured to suitable structural members 32—33 of the frame 10. The work supports 19—20 are also preferably carried by the platens 30—31, or if not insulated from them the work supports may be integral parts of the platens. The rolls 28 preferably have trunnions 34—35 supported in adjustable bearings 36—37 by step screws 38—39, by which the rolls 28 may be vertically adjusted. Preferably the tops of the lower rolls 28 of the roller clamps should be even with or slightly above the top surfaces of the platens to avoid bending the work below those surfaces when the eccentric clamps are tightened. I prefer to make the rolls 29 eccentric to their bearing spindles 40 with which they are preferably made integral. The spindles 40 of the rolls 29 are supported in bearings in the brackets 41 which are secured to the platens 30—31. The ends of the spindles 40 project beyond their bearings and have keyed to them the bifurcated operating levers 42 which are provided with handles 43. It will be understood that the brackets 41 may be made vertically adjustable if desired, such as by placing shims 41ª under the shoulders 41ᵇ as shown in Fig. 5 or by other suitable means.

Alternating current for welding is preferably supplied by the welding transformer 44 which is shown slidably mounted upon the members 3 of the frame 1. It will be understood that current of the ordinary factory circuit potentials, 220 or 440 volts, may be conducted to the primaries of the transformer 44 in any suitable manner such, for instance, as by the electrical apparatus and connections shown diagrammatically in Fig. 6. The secondary of the transformer is preferably a single turn winding having downwardly projecting terminals 45—46 in which the shaft 47, which supports the revoluble electrodes 23—24, has its bearings at 48—49.

The shaft 47 is preferably insulated from the electrodes 23—24 as well as from the secondary terminals 45—46, and the electrodes 23—24 are insulated from each other in well known manner. Current may be conducted from the terminals 45—46 to the electrodes 23—24 by means of suitable sets of brushes 50—51 which are mounted in adjustable brush holders secured to the terminals 45—46 by suitable means such as the bolts 52—53.

Anti-friction bearings 54 may be provided for supporting the transformer 44 upon the frame members 3 and a suitable motor 55 may be employed to move the transformer 44 back and forth along its supports 3.

As shown in the drawings, the motor 55 is mounted upon a plate 56 carried by extensions of the frame members 3. The motor shaft may be provided with a worm 57 which drives a worm wheel 58 and this worm wheel may have an internally threaded hub engaging the threaded rod 59 which rod is connected to the transformer housing at 60.

By operating the motor 55, the transformer 44 may be moved along the supports 3. Limit switches 61—62 may be employed for making and breaking the control circuits for starting and stopping the motor 55 and for opening and closing the primary circuit of the transformer 44.

The switches 61—62 may be mechanically connected for operation by means such as the rod 63 which has a threaded portion 64 carrying adjustable stops 65—66 which are adapted to be engaged by an operating member 67 secured to the transformer 44. As the transformer moves to the end of its predetermined travel in the direction shown by the arrow in Fig. 1, the operating member 67 will engage the stop 66 and move the rod 63 until switch 62 is opened. The opening of switch 62 opens the primary circuit of the transformer 44, the motor armature circuit also will be opened and the motor 55 will be stopped.

The connection between switches 61—62 is such that switch 61 cannot be closed until after switch 62 has been opened.

To start the transformer in the reverse direction, switch 61 may be closed by means of the lever 68 whereupon the motor 55 will first be started and then the primary circuit of the transformer 44 will be closed as will be further explained.

I prefer to control the starting and stopping of the motor 55 and the opening and closing of the primary circuit of the transformer 44 by interconnected means to always insure that the motor 55 shall be running and the transformer 44 moving before the transformer windings are energized and conversely, that the transformer windings be de-energized before the transformer 44 stops moving. Should the welding circuit be closed through the work and the electrodes while the latter are stationary, burning and pitting of the electrodes and the work would occur. To close and open the transformer and motor circuits in the desired order I prefer to employ the apparatus and electrical connections shown diagrammatically in Fig. 6.

As shown in this figure the primary winding 69 of the welding transformer is connected to the alternating current supply circuit 70 by the main switch 71. The secondary winding of the transformer is shown at 72. An electro-magnetic brake 73 is mounted upon the shaft of the motor 55 and is so connected that when the motor armature circuit is open the brake is applied and when the motor armature circuit is closed the brake is released. The motor 55 may receive its current supply from the same circuit 74 that supplies the switch control circuits.

61 and 62 are triple pole knife switches. Switch 61 has a pair of contacts 75 and 76 which are made longer than the third contact 77 to cause their co-acting switch blades 78—79 to contact with them earlier and remain in contact longer than the switch blade 80 does with contact 77. Similarly, switch 62 has a pair of contacts 81—82 which are longer than contact 83, whereby their co-acting blades 84—85 will make contact earlier and maintain it longer than blade 86 does with contact 83. Switch blade 78 and 79 and 84 and 85 control the operation of motor 55 by controlling the flow of current through the coils of the electro-magnetic switches 87—88 respectively, while switches 84—85 control the primary circuit of the transformer by controlling the flow of current through the coils of the electro-magnetic switches 89—90. I prefer to make the primary winding 69 of the transformer 44 adjustable as to the number of its turns as is diagrammatically shown in the drawing. An auto-transformer 91 may also be employed for varying the voltage impressed upon the transformer winding 69 of the welding transformer.

It will be understood that suitable circuit control apparatus other than that shown in the drawings and above described may be used for insuring the opening and closing of the circuits in the preferred order or sequence that I have mentioned.

Fig. 7 diagrammatically illustrates my invention being employed to electrically weld together the ends of coils of strip metal. Here the welding machine is shown at 92, a strip reeling machine at 93 and a shearing machine at 94. A coil of strip metal is shown at 95 mounted upon a suitable support 96. A motor 97 or other convenient driving means may be used for rotating the reel 93. This arrangement of apparatus may be employed where it is desired to end-weld together a number of coils of strip metal to produce any desired length of strip, such for instance as may be advantageous in the subsequent fabrication of the strip into tubing or other articles.

A coil of strip may be mounted upon the reel carried by the support 98, the outer end of the coil being brought back through the welder 92 and its end sheared square by the shear 94. The reel 93 may then be operated to draw the end 18 of the coil that has been sheared square into position in the welder with its seam edge properly positioned between the supporting bars 19 and 20. Another coil of strip such as 95 will then be placed upon the support 96, the outer end of the coil 95 will be sheared square by the shear 94 and drawn forward between the clamping rolls 28—29 upon the left hand side of the welder 92 until the seam edge of the end 17 of coil 95 abuts against the seam edge of the end 18 of the coil upon reel 93. The levers 42 upon the opposite sides of the seam-cleft will then be depressed to cause the edges of the seam-cleft to be pressed firmly together and the ends of the strips 17—18 to be securely clamped between the respective pairs of rolls 29—28.

During the positioning and clamping of the ends 17—18 of the strips, the electrodes 23—24 and transformer 44 preferably will be positioned at the left of the work with the electrodes not in contact with it. The work having been clamped in the work support, switch 62 will be manually closed as shown in Fig. 1 and diagrammatically in Fig. 6 (it being understood that the main switch 71 that controls the primary circuit of the welding transformer and the main switch 99 that controls the motor armature and magnetic switch circuits are closed), the armature of motor 55 will be first energized by the closing of the switch 87, the motor will start and immediately afterward the primary winding 69 of the transformer will be energized by the closing of switches 89—90. The transformer 44 will now move to the right as viewed in Fig. 1, the electrodes will roll along on the top surfaces of the work adjacent to the seam-cleft and welding current will flow across the seam-cleft between electrodes 23—24, causing the edges of the seam-cleft 22 to be progressively welded together, as the zone of concentrated current flow traverses the seam between the electrodes.

When the operating member 67 engages the stop 66 the switch 62 will be opened, switch blade 86 first leaving contact 83, de-energizing electro-magnetic switches 89—90 which will de-energize the welding circuit. An instant later, switch blades 84—85 will leave contacts 81—82 de-energizing electro-magnetic switch 87 which will open the motor armature circuit and stop the motor. It will be understood that stop 66 should be so adjusted as to be engaged by operating member 67 and open the welding current circuit when the electrodes arrive at the end of the seam to be welded.

To prevent arcing at the beginning and ending of the welding operation, strips of metal 100—101 of the same thickness as that of the work may be laid upon the work supports 19—20 beside the work and the closing and opening of the switches 89—90 will be made such that current will flow through these strips 100—101 respectively slightly before and slightly after the electrodes contact with the work.

It will be understood that the height of the work frame 10 and consequently the height of the work supporting bars 19—20 will be adjusted to give the proper pressure between the electrodes and the work.

The work supporting bars 19—20 and the clamps 28—29 may be made of any desired length to accommodate any width of strips or sheets that it is desired to weld together.

After the ends 17—18 of the two coils have been welded together, the reel 93 may be operated to wind the coil 95 upon it. Just before the inner end of coil 95 passes through the shear 94 it should be sheared square and thereafter brought into position between the supporting bars 19—20. Another coil may then be placed upon the support 96, its outer end sheared square in the shear 94, and drawn forward into position against the end of the coil that has just been welded to the stock upon reel 93.

Lever 68 may then be operated to close switch 61 which will start the motor 55 by closing switch 88 to cause the transformer to move in the reverse direction. The primary winding 69 of transformer 44 will again be energized by the closing of switches 89—90 and the ends of the strips which have been clamped by rolls 28—29 will be welded together as the transformer 44 and electrodes 23—24 are moved to the left as seen in Fig. 1. Or, the work may be lowered out of contact with the electrodes by manipulating screws 12 and the transformer may be traversed back to the left hand side of the machine as viewed in Fig. 1, then the work may be raised again into position to contact with the electrodes and the welding operation may be performed while the transformer again moves to the right after lever 68 has been thrown to close switch 62.

While I have shown the brushes 50—51 contacting with the same surfaces of the electrodes 23—24 that contact with the work, it will be understood by those skilled in the art that contact hubs may be provided upon electrodes 23—24 with which the brushes may contact instead of contacting with surfaces which contact with the work. For instance, the brushes may be made to contact with the hubs 23ª—24ª of the electrodes.

I claim:—

1. In apparatus for electrically welding together the contacting surfaces of an open butt-seam in metal, a work support adapted to support the work upon opposite sides of and closely adjacent to the seam-cleft throughout the length of the seam to be welded, means for holding the work upon said work support with the edges of the seam-cleft to be welded pressed together, an electric circuit, a pair of electrodes included in said circuit and adapted to contact with the work upon the respective opposite sides of the seam-cleft closely adjacent thereto whereby the flow of electric current across the seam-cleft will be largely concentrated in a narrow path between said electrodes, means for causing the electrodes to press firmly upon the work, and means for causing relative traversing movement of said electrodes and the work parallel to said seam-cleft.

2. In apparatus of the class described, a work-support, means for holding the work upon and stationary relative to said work-support with the edges of the seam-cleft to be welded pressed together, an electric circuit, a pair of electrodes included in said circuit adapted to contact with the work upon the respective opposite sides of the seam-cleft to cause electric current to flow across said seam-cleft between said electrodes, means for varying the distance between said work-support and said electrodes to vary the pressure of the electrodes upon the work and means for causing relative traversing movement of said electrodes and the work parallel to said seam-cleft, said work-support consisting of a structure having a pair of parallel separated work-supporting members arranged in vertical alignment with the respective electrodes to thereby receive the direct thrust of the electrodes through the work.

3. In apparatus for electrically welding together the contacting surfaces of an open butt-seam in metal, work supporting members comprising a pair of spaced-apart parallel bars adapted to support the work upon opposite sides of the seam-cleft closely adjacent thereto but not at the seam-cleft, means for holding the work upon said bars with the edges of the seam-cleft to be welded pressed together opposite the space between said bars, an electric circuit, a pair of electrodes included in said circuit adapted to contact with the work upon the respective opposite sides of the seam-cleft to cause electric current to flow across said seam-cleft between said electrodes, and means for causing relative traversing movement of said electrodes and the work parallel to said seam-cleft, said work supporting members being arranged in vertical alignment with the respective electrodes to thereby receive the direct thrust of the electrodes through the work.

4. In apparatus for electrically welding together the contacting surfaces of edge-butted metal sheets, a pair of spaced-apart parallel work-supports adapted to support the work throughout the length to be welded and upon opposite sides of the seam-cleft closely adjacent thereto but not at the seam-cleft, means for holding the work upon said work supports with the edges of the seam-cleft pressed together opposite the space between said work supports, an electric circuit, a pair of electrodes included in said circuit adapted to contact with the work upon the respective opposite sides of the seam-cleft to cause electric current to flow across said seam-cleft between said electrodes, means for causing pressure of the electrodes upon the work and means for causing relative traversing movement of said electrodes and the work parallel to said seam-cleft.

5. In apparatus of the class described, a work support comprising a pair of spaced-apart supporting members adapted to support the work throughout the length of the seam to be welded upon opposite sides of the seam-cleft closely adjacent thereto but not at the seam-cleft, means for holding the work upon said work-support with the edges of the seam-cleft to be welded pressed together, an electric circuit, a pair of roller electrodes included in said circuit, means for supporting said electrodes above said work-support, said electrodes being adapted to contact with the work upon the respective opposite sides of the seam-cleft to cause electric current to flow across said seam-cleft between said electrodes, means for causing said electrodes to forcibly press upon and to roll on said work parallel to said seam-cleft, said work-supporting members being arranged in vertical alignment with the respective electrodes to thereby receive the direct thrust of the electrodes through the work.

6. In apparatus of the class described a work-support adapted to support the work upon opposite sides of and closely adjacent to the seam-cleft throughout the length of the seam to be welded, means for holding the work upon said work-support with the edges of the seam-cleft to be welded pressed together, an electric transformer, a pair of roller electrodes supported by said transformer and electrically connected to the secondary terminals thereof, means for supporting said transformer above said work-support with said electrodes engaging the work upon the respective opposite sides of the seam-cleft to cause electric current to flow across said seam-cleft between said electrodes, means for varying the distance between said work-supports and said electrodes to vary the pressure of the latter upon the work, and means for causing relative traversing movement of said electrodes and the work parallel to said seam-cleft.

7. In apparatus of the class described, a work-support, means for holding the work upon said work-support with the edges of the seam-cleft to be welded pressed together, an electric transformer, a pair of roller electrodes supported by said transformer and electrically connected to the secondary terminals thereof, means for supporting said transformer above said work-support with said electrodes engaging the work upon the respective opposite sides of the seam-cleft to cause electric current to flow across said seam-cleft between said electrodes means for varying the distance between said work-support and said electrodes to vary the pressure of the latter upon the work, means for causing relative traversing movement of said electrodes and the work parallel to said seam-cleft, an electric circuit including the primary windings of said transformer, an electric switch in said circuit and switch operating means connected to said switch actuated by said relative traversing movement of said transformer and electrodes and the work to open said switch at one point in said traversing movement.

8. In apparatus of the class described, a work-support, means for holding the work upon said work-support with the edges of the seam-cleft to be welded pressed together, an electric transformer, a pair of roller electrodes supported by said transformer and electrically connected to the secondary terminals thereof, means for supporting said transformer above said work-support with said electrodes engaging the work upon the respective opposite sides of the seam-cleft to cause electric current to flow across said seam-cleft between said electrodes, means for varying the distance between said work-support and said electrodes to vary the pressure of the latter upon the work, means for traversing said transformer and electrodes to cause said electrodes to roll upon the work parallel to said seam-cleft, an electric circuit including the primary windings of said transformer, an electric switch in said circuit switch operating means connected to said switch and means connected to said transformer co-acting with said switch operating means to open said switch at one point in the movement of said transformer.

9. In apparatus of the class described, a work-support, means for holding the work upon said work-support with the edges of the seam-cleft to be welded pressed together, an electric transformer, a pair of roller electrodes supported by said transformer and electrically connected to the secondary terminals thereof, means for supporting said transformer above said work-support with said electrodes engaging the work upon the respective opposite sides of the seam-cleft to cause electric current to flow across said seam-cleft between said electrodes, means for varying the distance between said work-support and said electrodes to vary the pressure of the latter upon the work, said support for said transformer being adapted to permit it to be moved to cause said roller electrodes to roll along the work parallel to said seam-cleft, a motor, connections between said motor and said transformer for moving the latter upon its support, an electric circuit including said motor, an electric switch in said circuit and means actuated by the movement of said transformer for causing said switch to open at one point in the movement of said transformer.

10. In apparatus for electrically welding together the contacting surfaces of an open butt-seam in metal, a work support adapted to support the work at the seam-cleft throughout the length of the seam to be welded, means for holding the work upon said work support with the edges of the seam-cleft to be welded pressed together, an electric circuit, a pair of electrodes included in said circuit and adapted to contact with the work upon the respective opposite sides of the seam-cleft closely adjacent thereto whereby the flow of electric current across the seam-cleft will be largely concentrated in a narrow path between said electrodes, means for causing the electrodes to press firmly upon the work, said work support being disposed opposite the electrodes to withstand the pressure of the electrodes upon the work, and means for causing relative traversing movement of said electrodes and the work parallel to said seam-cleft.

11. In apparatus of the class described means for supporting two sheet metal blanks with an edge surface of one of the blanks in registering abutting relation to an edge surface of the other blank said supporting means being disposed along the seam formed by the abutting edge surfaces and co-extensive with the length of said seam, adjustable pressure means adapted to press the butted seam surfaces together thoughout the length of the seam, a pair of spaced-apart electrodes adapted to contact with small areas upon the respective blanks and upon the respectively opposite sides of the seam-cleft closely adjacent thereto, and means for causing progressive relative traversing movement of said sheet metal blanks and said electrodes to cause said seam to be progressively welded, said electrodes being included in an electric welding circuit.

12. In apparatus of the class described a work support adapted to support the work upon opposite sides of and closely adjacent to the seam-cleft throughout the length of the seam to be welded, means for holding the work upon said work-support with the edges of the seam-cleft to be welded pressed together, a source of electric current supply, a pair of electrodes supported above the work adapted to make contact with the work upon the respectively opposite sides of the seam-cleft, said electrodes being electrically connected to said source of electric current supply, means for supporting said electrodes above the work, means for varying the distance between said work-support and said electrodes to vary the pressure of the latter upon the work, and means for causing relative traversing movement of said electrodes and the work parallel to said seam-cleft.

13. In apparatus for electrically welding together the contacting surfaces of an open butt-seam in metal, an electric welding circuit including a pair of electrodes adapted to make contact upon the work upon the respective opposite sides of the seam to be welded closely adjacent thereto, a work-support not included in the welding circuit, coextensive with the length of the seam to be welded and adapted to support the work and the pressure of the electrodes at the seam-cleft, means for causing the electrodes to press upon said work upon said work-support, and means for causing progressive relative traversing movement of said electrodes and said work.

14. In apparatus of the class described a work-support longitudinally stationary relative to the work and coextensive with the length of the seam to be welded and adapted to support the work closely adjacent to the seam-cleft with the surfaces of the seam-cleft to be welded in registering abutment, means for pressing the surfaces of the seam-cleft together, an electric welding circuit, a pair of electrodes included in said circuit adapted to contact with the work upon the respective opposite sides of the seam-cleft, and means for traversing said electrodes upon the work parallel to said seam-cleft.

15. In apparatus of the class described a work-support longitudinally stationary relative to the work and coextensive with the length of the seam to be welded and adapted to support the work closely adjacent to the seam-cleft with the surfaces of the seam-cleft to be welded in registering abutment, means for pressing the surfaces of the seam-cleft together, an electric welding circuit, a pair of roller electrodes included in said circuit adapted to contact with the work upon the respective opposite sides of the seam-cleft, and means for causing relative traversing movement of said electrodes and said work parallel to said seam-cleft.

16. In apparatus for electrically welding together the contacting surfaces of an open butt-seam in metal, a work-support longitudinally stationary relative to the work and coextensive with the length of the seam to be welded and adapted to support the work at the seam-cleft with the edges of the seam-cleft in registering abutting relation, means for pressing the work on opposite sides of the seam-cleft toward the seam-cleft, an electric circuit, a pair of electrodes included in said circuit and adapted to contact with the work upon the respective opposite sides of the seam-cleft closely adjacent thereto, means for causing the electrodes to press firmly upon the work, and means for causing relative traversing movement of said electrodes and the work parallel to said seam-cleft.

17. A method of welding an open butt-seam in metal which consists in supporting the work along the bottom upon opposite sides of the seam-cleft closely adjacent thereto throughout the length of the seam to be welded, pressing together the edges of the seam-cleft, applying the terminals of an electric welding circuit to the top surface of the work closely adjacent to the seam-cleft upon the respective opposite sides of the seam-cleft, causing electric current to flow across the seam-cleft in a narrow path between said terminals, and causing progressive relative traversing movement of said path and the work along the seam whereby the seam is progressively welded.

18. A method of welding an open butt-seam in metal which consists in supporting the work upon one of its surfaces upon opposite sides of the seam-cleft closely adjacent thereto throughout the length of the seam to be welded, pressing together the edges of the seam-cleft, causing the terminals of an electric welding circuit to make contact with the unsupported surface of the work upon small areas thereof upon the respectively opposite sides of the seam-cleft, causing electric current to flow across the seam-cleft in a narrow path between said terminals, and causing progressive relative traversing movement of said path and the work along the seam whereby the seam is progressively welded.

19. A method of welding an open butt-seam in metal which consists in pressing together the surfaces of the seam-cleft throughout a length of the seam to be welded, pressing the terminals of an electric welding circuit upon small areas of the surfaces of the work upon the respective opposite sides of the seam-cleft closely adjacent thereto, causing progressive relative traversing movement of said terminals and said work parallel to said seam and supporting the work against the pressure of said terminals throughout said length of the seam to be welded.

FRANK L. SESSIONS.